Figure 1:
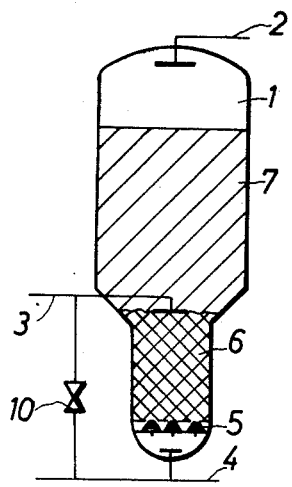

Sept. 29, 1964

H. CORTE 3,151,070

MIXED SINGLE BED DEIONIZATION

Filed Nov. 17, 1959

INVENTOR.
HERBERT CORTE
BY Connolly and Hutz
his ATTORNEYS

United States Patent Office 3,151,070
Patented Sept. 29, 1964

3,151,070
MIXED SINGLE BED DEIONIZATION
Herbert Corte, Leverkusen, Germany, assignor to Farbenfabriken Bayer-Aktiengesellschaft, Leverkusen, Germany, a corporation of Germany
Filed Nov. 17, 1959, Ser. No. 853,576
Claims priority, application Germany Nov. 28, 1958
2 Claims. (Cl. 210—190)

This invention relates to a mixed single bed ion-exchange apparatus and more especially to a cylindrical mixed bed ion-exchange apparatus having a smaller diameter in the lower portion than in its upper portion.

It is known to provide for mixed bed ion-exchange a cylinder in which a single bed comprising a mixture of cation and anion exchangers is placed on a filter plate provided with nozzles or on a screen. Water to be treated is passed through this bed until the exchange capacity of the ion exchange resins is exhausted. Regeneration of the exhausted filter bed is then accomplished by stratifying the bed into an upper layer of anion exchange and a lower layer of cation exchanger thereby relying on the fact that the anion exchangers when wet have a lower density than the cation exchangers when wet. After stratification the single layers of cation and anion exchangers are regenerated separately and thereafter are remixed to form a mixed filter bed. To accomplish regeneration it is necessary to arrange a distributor system serving for the distribution or the collection of a regenerating liquid at the interface of the layers which are obtained after the hydraulic grading of the two resins. Apparatus and methods for carrying through the deionization of water or other liquids in a mixed bed filter are well known in the art and are, for instance, disclosed in U.S. specifications 2,666,741, 2,692,244 and 2,771,424. These mixed bed filters have certainly proved satisfactory in principle, but in many cases difficulties have arisen.

In the first place, it has been found that the forces which act during the regeneration or operation of mixed bed filters on the distribution system increase as the diameter of the filter is enlarged to such a degree that it is only with great difficulty that they can be controlled at diameters greater than 2.5 m. and thus render considerable reinforcement necessary. Consequently, it has been found more desirable to use several filters with relatively small diameters instead of one large filter, although this considerably increases the costs. Another imperfection of the known mixed bed filters consists in that in many cases it is necessary to use more cation exchanger than is necessary for the reaction, since otherwise the height of the cation exchanger layer obtained after grading of the exhausted mixed bed is not great enough and thus only a poor and unreliable regeneration can be obtained.

Furthermore, the known mixed bed filters also show the defect that a satisfactory reflushing of the exhausted mixed exchangers in order to accomplish hydraulic stratification is not possible with large differences in density and/or grain size between cation and anion exchangers, since with the correct reflushing velocity for the lighter exchanger, the heavier exchanger shows no movement at all or only unilateral movement, while on the other hand, when the reflushing speed is correct for the heavier exchanger, the lighter exchanger experiences too great a distention of its filter layer. Consequently, very large additional space is necessary for avoiding losses of material during reflushing.

These defects of the known mixed bed filters can be avoided according to the invention by providing a cylindrical mixed bed filter having a smaller diameter in its lower cylindrical portion than in its upper cylindrical portion, both portions being connected by an intermediate frusto-conical element, said lower cylindrical portion having a volume at least as big as the volume of the cation exchanger present in the mixed bed filter, said filter having a distributor system for a regenerating liquid arranged beneath the lower end of said upper cylindrical portion.

Embodiments of mixed bed filters according to the invention are shown diagrammatically in the drawing.

The cylindrical filter member 1 contains the upper liquid supply device 2, the distributor system 3 is disposed at the boundary surface between two exchangers, the liquid discharge and air supply device 4 and the nozzle plate 5, on which rests for example the cation exchanger 6 when the bed is graded, or the mixture with the anion exchanger 7 when the bed is mixed.

Figure 2:
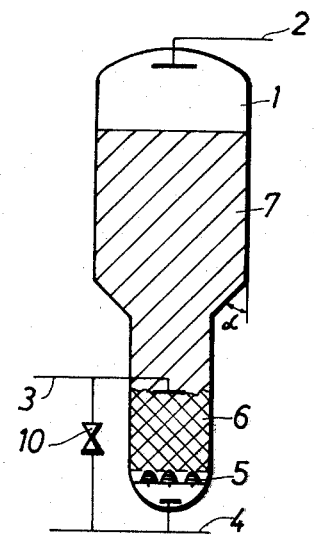

In the embodiment according to FIG. 1, the distrbutor system 3 is disposed substantially at the level of the bottom edge of the conical filter section, i.e. the volume of the filter section of smaller diameter is as large as the volume of the heavier exchanger, for example the cation exchanger. In the construction according to FIG. 2, on the other hand, the distributor system 3 is situated inside the cylindrical portion of smaller diameter, the volume of the cylindrical portion of smaller diameter being approximately as large as the volume occupied by the heavier exchanger during the reflushing operation.

As will easily be seen, the effect achieved by the mixed bed filter being constructed according to the invention is that:

(1) The distributor system can be kept of small diameter, (2) It is only necessary to introduce as much cation exchanger as is absolutely necessary, because beds or layers of any desired height can be produced by a suitable choice of the diameter of the smaller cylinder, (3) By suitable matching of the two diameters, the density differences of the exchangers can be taken into account, so that it is possible to obtain a common reflushing speed which is suitable for both exchangers.

It is for instance possible to provide the cylindrical two portions of the apparatus with diameters varying between about 1:1.3 and 1:3, whereas the angle which the wall of the conical section forms with the wall of the cylindrical portion may vary between about 5 to 60°, preferably 10 to 40°.

Figure 3:
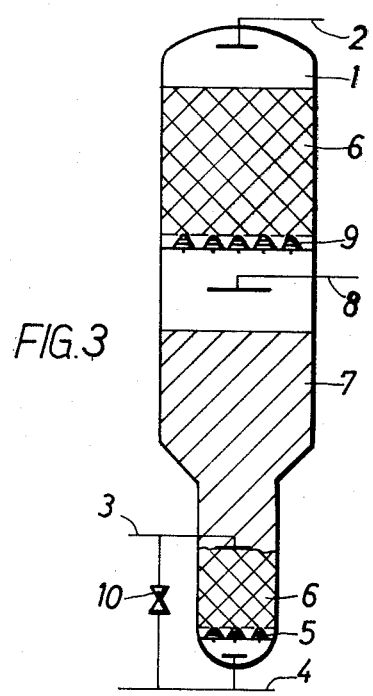

Due to the possibilty, with the arrangement according to the invention, of restricting the quantity of the heavier cation exchanger to a minimum, it is particularly advantageous for a cation exchanger regenerated with acid to be positioned above the mixed bed. An arrangement by which it is possible for this process to be carried out in a single filter element is shown diagrammatically in FIG. 3. In this case, in addition to the aforesaid parts, the filter element 1 also contains the discharge or supply device 8 for the regenerating liquid and a nozzle plate 9 on which the cation exchanger 6 rests. When regenerating, it is for example possible to operate in such a way that first of all concentrated aqueous caustic soda solution is introduced at 8, while simultaneously raw water is supplied by way of 2, which water serves as diluent for the caustic soda solution after flowing through the upper cation exchanger bed 6. The regenerating solution together with the raw water is discharged at 4. Raw water introduced by way of 2 also serves for washing out the regenerating solution. Thereafter, raw water is introduced by way of 4, while simultaneously acid is supplied by way of 2. The joint discharge takes place by way of 8. By this working method, the separation and stratification of the two exchangers of the mixed bed in the lower part of the filter and the regeneration of the upper cation exchanger are effected simultaneously. After washing out the regeneration acid with raw water by way of 2 to 8, whereby raw water is introduced again by way of 4, in order to block migration of the wash water into the lower layer, the regeneration of the lower cation exchanger bed is effected with acid by way of 3 towards 4. After washing out the last-mentioned regenerating acid, either air is injected at 4 or reflushing by means of raw water is carried out for a short time at high speed from 4 towards 8 or 2 for mixing the two exchangers of the mixed bed.

In operation, the supply of raw water is introduced at 2 and the extraction of pure water at 4. The extraction of pure water can with advantage also take place simultaneously by way of 4 and 3, for which purpose the valve 10 is opened. If the quality of the pure water is checked at the withdrawal point 3, this provides the possibility of taking the filter out of operation before the quality of the water is no longer sufficient.

I claim:

1. Cylindrical mixed bed filter suitable for adapting a mixture of cation and anion exchange resins, one of said resins being of higher density than the other resin, comprising means for stratifying said mixture of ion exchange resins into an upper layer of ion exchange resins of lower density and a lower layer of ion exchange resins of higher density, and comprising a distributor for a liquid arranged at the interface of said two layers, said cylindrical mixed bed filter having a smaller diameter in its lower portion than in its upper portion and at least equal to the volume of the resin of higher density, both portions being connected by a frusto-conical transition element and said distributor system being arranged below said upper portion.

2. Cylindrical mixed bed filter according to claim 1, comprising in its upper part a liquid permeable support suitable for adapting a cation exchange resin.

References Cited in the file of this patent

UNITED STATES PATENTS

| | | |
|---|---|---|
| 1,745,421 | Higgins | Feb. 4, 1930 |
| 2,483,485 | Barr | Oct. 4, 1949 |
| 2,666,741 | McMullen | Jan. 19, 1954 |
| 2,771,424 | Stronquist et al. | Nov. 20, 1956 |
| 2,803,347 | Whitlock | Aug. 20, 1957 |